(12) United States Patent
Mader et al.

(10) Patent No.: US 11,292,653 B2
(45) Date of Patent: Apr. 5, 2022

(54) SEALING STATION AND METHOD FOR PRODUCING SKIN PACKAGING WITH TEAR-OFF CORNER

(71) Applicant: MULTIVAC Sepp Haggenmüller SE & Co. KG, Wolfertschwenden (DE)

(72) Inventors: Andreas Mader, Dietmannsried (DE); Thomas Zedelmaier, Böhen (DE); Klaus Fischer, Erkheim (DE); Luciano Capriotti, Bad Grönenbach (DE); Stefan Dürmeier, Oberroth (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 318 days.

(21) Appl. No.: 16/115,664

(22) Filed: Aug. 29, 2018

(65) Prior Publication Data

US 2019/0062032 A1 Feb. 28, 2019

(30) Foreign Application Priority Data

Aug. 30, 2017 (EP) ..................................... 17188571

(51) Int. Cl.
*B26D 7/26* (2006.01)
*B65D 81/20* (2006.01)
(Continued)

(52) U.S. Cl.
CPC ....... *B65D 81/2076* (2013.01); *B26D 7/2614* (2013.01); *B29C 65/02* (2013.01);
(Continued)

(58) Field of Classification Search
CPC ....... B65B 7/164; B65B 7/165; B65B 31/028; B65B 61/065; B65B 61/18; B29C 65/02;
(Continued)

(56) References Cited

U.S. PATENT DOCUMENTS 4,685,274 A * 8/1987 Garwood .............. B65B 31/021
426/129
6,834,476 B2 * 12/2004 Konishi .................. B65B 7/164
53/329.4

(Continued)

FOREIGN PATENT DOCUMENTS

WO 2015121270 A1 8/2015
WO WO-2015121270 A1 * 8/2015 ....... B29C 66/73715
WO 2016193006 A1 12/2016

*Primary Examiner* — Thanh K Truong
*Assistant Examiner* — David G Shutty
(74) *Attorney, Agent, or Firm* — Brooks Kushman P.C.

(57) ABSTRACT

A sealing station for a packaging machine, the sealing station may be a tray sealer. The sealing station includes an upper die with a sealing plate and a lower die with a tray holder for receiving at least one packaging tray to be sealed. A cutting blade is arranged within the sealing station, and cuts a lid for closing the packaging tray out of a top film. The cutting blade has an endless cutting edge for cutting out the lid along its contour. The cutting blade includes a first and a second blade section, for cutting out a first and second section of the contour of the lid respectively. The second blade section may produce a tear-off corner in the lid projecting beyond the edge region. The sealing station may include a first clamping jaw on the sealing plate, and a second clamping jaw on the tray holder.

20 Claims, 14 Drawing Sheets

(51) Int. Cl.
*B65B 7/16* (2006.01)
*B65B 31/06* (2006.01)
*B65B 31/02* (2006.01)
*B29C 65/00* (2006.01)
*B29C 65/02* (2006.01)
*B29C 65/74* (2006.01)
*B65B 61/18* (2006.01)
*B65B 61/06* (2006.01)
*B29C 65/78* (2006.01)
*B29C 65/18* (2006.01)
*B29L 31/00* (2006.01)

(52) U.S. Cl.
CPC ........ *B29C 65/7461* (2013.01); *B29C 66/112* (2013.01); *B29C 66/131* (2013.01); *B29C 66/53461* (2013.01); *B29C 66/8161* (2013.01); *B29C 66/8322* (2013.01); *B65B 7/164* (2013.01); *B65B 7/165* (2013.01); *B65B 31/028* (2013.01); *B65B 61/065* (2013.01); *B65B 61/18* (2013.01); *B29C 65/18* (2013.01); *B29C 65/7847* (2013.01); *B29C 66/849* (2013.01); *B29L 2031/712* (2013.01)

(58) Field of Classification Search
CPC . B29C 65/7461; B29C 65/112; B29C 65/131; B29C 65/53461; B29C 65/8161; B29C 65/8322; B65D 7/2614; B65D 81/2076
See application file for complete search history.

(56) References Cited

U.S. PATENT DOCUMENTS

| | | | | |
|---|---|---|---|---|
| 8,281,559 | B2* | 10/2012 | Ehrmann | B29C 65/7891 |
| | | | | 53/510 |
| 8,871,424 | B2* | 10/2014 | Merical | B41M 5/282 |
| | | | | 430/270.1 |
| 9,003,745 | B2* | 4/2015 | Capriotti | B29C 65/7451 |
| | | | | 53/285 |
| 9,003,746 | B2* | 4/2015 | Holzem | B65B 51/14 |
| | | | | 53/329.3 |
| 9,073,656 | B2* | 7/2015 | Mader | B65B 61/065 |
| 9,266,635 | B2* | 2/2016 | Ickert | B29C 66/92921 |
| 9,481,480 | B2* | 11/2016 | Harlacher | B65B 31/043 |
| 9,555,910 | B2* | 1/2017 | Vaccari | B65B 31/028 |
| 9,650,164 | B2* | 5/2017 | Holzem | B65B 7/164 |
| 9,902,509 | B2* | 2/2018 | Schiavina | B29C 65/7451 |
| 10,150,584 | B2* | 12/2018 | Schiavina | B29C 66/849 |
| 2004/0194432 | A1* | 10/2004 | Muller | B65D 81/075 |
| | | | | 53/427 |
| 2004/0206048 | A1* | 10/2004 | Iuchi | B29C 66/24221 |
| | | | | 53/329.2 |
| 2010/0287893 | A1* | 11/2010 | Ehrmann | B65B 7/164 |
| | | | | 53/487 |
| 2011/0072764 | A1* | 3/2011 | Daniek | B29C 66/8221 |
| | | | | 53/556 |
| 2014/0116002 | A1* | 5/2014 | Denny | B29C 66/8322 |
| | | | | 53/329.2 |
| 2015/0210413 | A1* | 7/2015 | Schiavina | B29C 66/83221 |
| | | | | 53/86 |
| 2016/0355283 | A1* | 12/2016 | Capitani | B29C 65/7841 |
| 2017/0305586 | A1* | 10/2017 | Rizzi | B29C 65/224 |
| 2019/0055040 | A1* | 2/2019 | Capitani | B65B 41/16 |

* cited by examiner

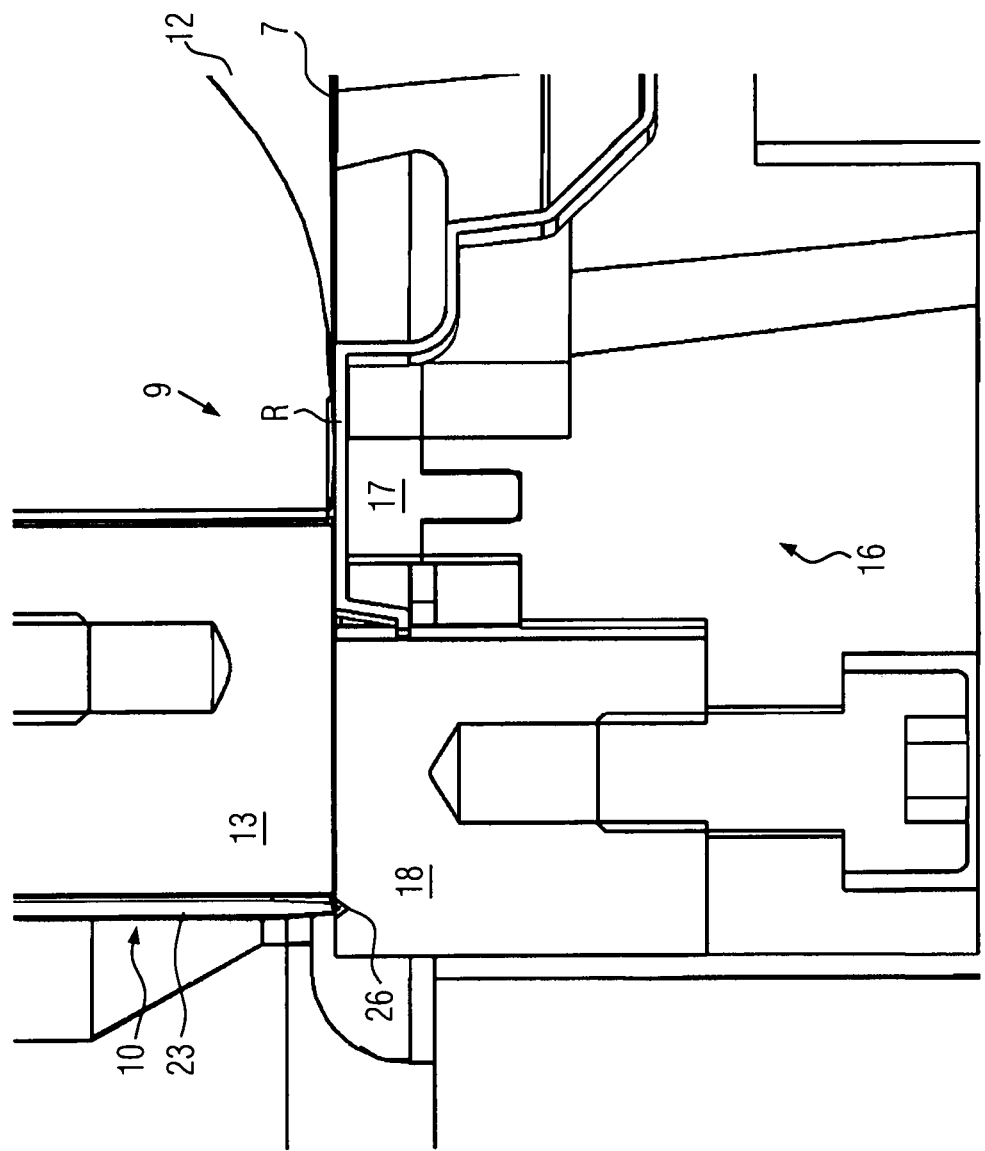

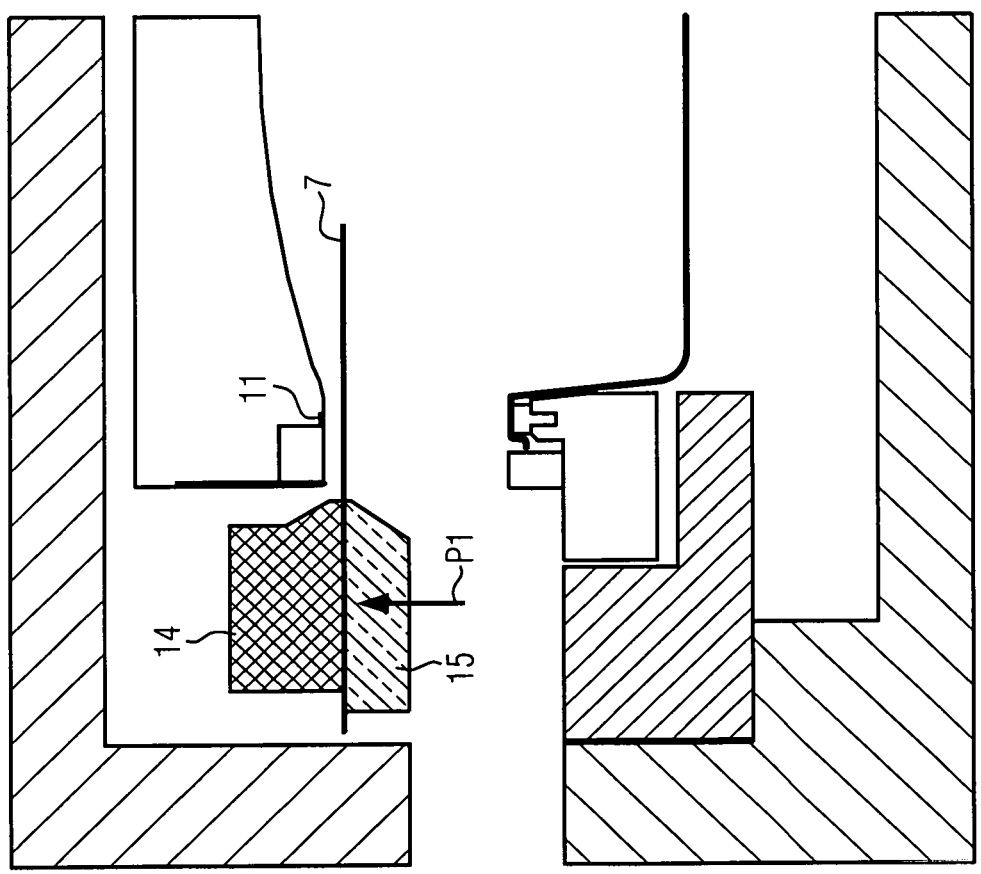

SEALING STATION AND METHOD FOR PRODUCING SKIN PACKAGING WITH TEAR-OFF CORNER

CROSS-REFERENCE TO RELATED APPLICATIONS

This Application claims priority to European Patent Application No. 17 188 571.8 filed on Aug. 30, 2017 to Andreas Mader, Thomas Zedelmaier, Klaus Fischer, Luciano Capriotti and Stefan Dürmeier, currently pending, the entire disclosure of which is incorporated herein by reference.

FIELD OF THE INVENTION

The invention refers to a sealing station for a packaging machine, which is in particular in the form of a tray sealer in order to produce vacuum skin packaging. Furthermore, the invention refers to a method for the production of skin packaging.

BACKGROUND OF THE INVENTION

In practice, vacuum skin packaging is mainly used to extend the shelf life of products enclosed in them. Skin films are used as the top film material, which are thermoformed tightly, especially tension-free, like a "second skin" around the product received in a packaging tray. This also allows the enclosed product to be held in a stable position on the packaging tray, which brings further advantages in the presentation of the products. In the case of meat products, vacuum skin packing is also used in particular to prevent meat juice from settling and accumulating in the packaging tray.

EP 1 747 995 A1 discloses a sealing device adapted to seal trays with films which are thermoformed using a vacuum skin process to produce vacuum skin packaging. The skin film is, seen in top view, cut out along a peripheral edge of the packaging tray and sealed with it.

EP 2 441 683 B1 discloses a method for cutting a lid film in a tray sealing station of a packaging machine. The lid film can be used as a skin film for the production of vacuum skin packaging.

With known vacuum skin packaging of the type described above, the products are held down tightly enclosed by the skin film in the tray under vacuum seal. This can make it difficult to open the vacuum skin packaging, at least by means of a two-finger grip. This problem also exists with other types of packaging, i.e. packaging types without skin film.

SUMMARY OF THE INVENTION

The invention is therefore based on the object of providing a device for the production of packaging, in particular vacuum skin packaging, whereby the packaging produced in this way can be easily opened. Furthermore, it is the object of the invention to provide a method for the production of improved vacuum skin packaging.

The invention refers to a sealing station for a packaging machine, in particular one embodiment is in the form of a tray sealer. The sealing station comprises an upper die with a sealing plate and a lower die with a tray holder for holding at least one packaging tray to be closed.

A cutting blade may be arranged inside the sealing station, by means of which a lid for closing the packaging tray can be cut out of a top film, the cutting blade having an endless cutting edge which forms a first and a second blade section for cutting out the lid along its contour. The first blade section may be formed to cut out a first section of the lid's contour in plan view of an edge area of the packaging tray. The second blade section may be formed to cut out at least one second section of the lid's contour, which extends in plan view outside the edge area of the packaging tray, in order to produce a tear-off corner in the lid that extends beyond the edge area.

According to the invention, a first clamping jaw may be provided on the sealing plate outside a sealing surface provided thereon for producing a sealing seam and a second clamping jaw on the tray holder, whereby the two clamping jaws can be pressed together for cutting out the tear-off corner in order to clamp the top film in between. The two clamping jaws work together as a clamping unit in such a way that the top film material clamped between them may be precisely positioned for cutting out the tear-off corner and fixed for a cutting process. The use of the two clamping jaws also results in further procedural advantages for method steps following the cutting process, for example for sealing the lid and/or for method steps for producing a skin film lid.

Preferably, the first and/or second clamping jaws are at least partly made of a plastic material, for example of PE material (polyethylene) and/or of PA material (polyamide), preferably of PA6 material (polycaprolactam). PE material may be easy to clean and prevents bacterial cultures from settling, making it particularly suitable for use in the food industry. PA material may be particularly wear-resistant. In principle, the top film material can be fixed excellently between plastic clamping jaws. In addition, a plastic clamping jaw may be suitable as a counter bearing, so to speak as a cutting base, for a gentle use of the cutting blade.

It may be also advantageous if the first and/or second clamping jaw are made of a material with a lower thermal conductivity than the sealing plate. The clamping jaws thus act as heat insulators relative to the sealing plate to appropriately prevent heat conduction from the sealing plate, especially from the sealing surface formed thereon, via the clamping jaws onto the tear-open corner. This reduces the formation of wrinkles in the tear-off corner.

One variant envisages that the second blade section may be shaped so that it lies against the first clamping jaw at least in sections. This ensures a stable and compact arrangement of the second blade section on the sealing plate.

The two clamping jaws can be integrated into the sealing station, i.e. on the sealing plate and on the tray holder, in a particularly space-saving manner if they have a smaller radius than a (corner) area of the sealing plate or the tray holder, at least partially seen in plan view.

For improved operation of the sealing station, the first clamping jaw may be detachably attached to the sealing plate and/or the second clamping jaw may be detachably attached to the tray holder. The clamping jaws can thus be easily removed for cleaning purposes. In addition, different clamping jaws can be used to produce differently shaped tear-off corners.

It may be also useful if the first clamping jaw is designed in such a way that it can be partially pressed onto the top film over the edge area of the packaging tray when the lid in plan view is cut out. This ensures additional fixing of the top film and the tray holder, whereby the area of the tear-off corner in particular can be better fixed relative to the tray holder.

A preferred variant may be that the second blade section may be formed to at least partially extend into the second clamping jaw when the first clamping jaw may be pressed against the second clamping jaw to cut out the tear-off corner. Slippage of the film material is then not possible, especially during a subsequent stroke-controlled method step, for example a sealing process. In particular, the second blade section can be designed in such a way that its cutting edge may be arranged with respect to the first clamping jaw slightly projecting facing towards the second clamping jaw. This ensures a smooth cut along the contour of the tear-off corner and ensures also a clean cut in the transition zone between the tear-off corner and the rest of the lid film.

Preferably, the sealing plate has a plurality of ventilation openings for the production of skin packaging. A vacuum can be created through the ventilation openings in a closed sealing chamber of the sealing station to raise the top film towards the sealing plate for heating. This makes the top film more stretchable, which can then be drawn down onto the (food) product positioned in the packaging tray by lifting the vacuum above the top film, i.e. by aerating the sealing chamber, as a "second skin", i.e. in close contact.

One variant provides that the sealing plate within the sealing surface formed on it has a cavity directed away from the tray holder. During the vacuum skin process, the skin film can be drawn into the cavity in order to be effectively preheated by the sealing plate to a skin temperature.

The invention also concerns a method for producing skin packaging (hereinafter also referred to as "vacuum skin packaging"), wherein a lid with at least one tear-off corner may be cut out of a top film provided as skin film by means of a cutting blade arranged within a sealing station of a packaging machine, and wherein a sealing seam may be produced all around an edge region of a packaging tray provided within the sealing station, wherein the tear-off corner of the lid cut out of the skin film projects beyond the edge region of the packaging tray outside the sealing seam in plan view.

Vacuum-skin-packed products can be opened better by means of the tear-off corner.

A particularly suitable fixation of the skin film exists when a first clamping jaw, which is attached to the sealing plate, presses the skin film against a second clamping jaw, which is attached to the tray holder in order to produce the tear-open corner of the lid. By means of such a clamp fixing, the tear-off corner can be produced particularly reliably. This results in additional advantages in terms of quality and aesthetics for the tear-off corner.

An advantageous variant may be that one section of the blade at least partially extends into the second clamping jaw when the first clamping jaw may be pressed against the second clamping jaw to cut out the tear-off corner. This means that the film material can be fixed not only force-fit but also form-fit between the clamping jaws. As a result, process steps following cutting-out of the lid within the sealing station, specifically a particularly stroke-controlled sealing process and/or process steps for manufacturing the skin can better be carried out.

To cut out the tear-off corner, it may be advantageous if the first clamping jaw presses on the skin film over a part of the edge area of the packaging tray in plan view when cutting out the lid. This ensures in particular an improved fixation of the skin film in the area of the tear-off corner relative to the packaging tray.

A preferred variant may be for the sealing plate to ventilate the skin film from above so that it fits tightly against a product in the packaging tray. Preferably, the pressure supply can be controlled on the basis of different product-related pressure curves. Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show:

FIG. 8 is a section view of one embodiment of a sealing station in accordance with the teachings of the present disclosure in the area for producing the tear-off corner with the second blade section received in a clamping jaw;

FIG. 9B is a schematic sectional view of one embodiment of a sealing station in accordance with the teachings of the present disclosure showing one of the process steps for producing skin packaging;

DETAILED DESCRIPTION OF THE INVENTION

Figure 1:
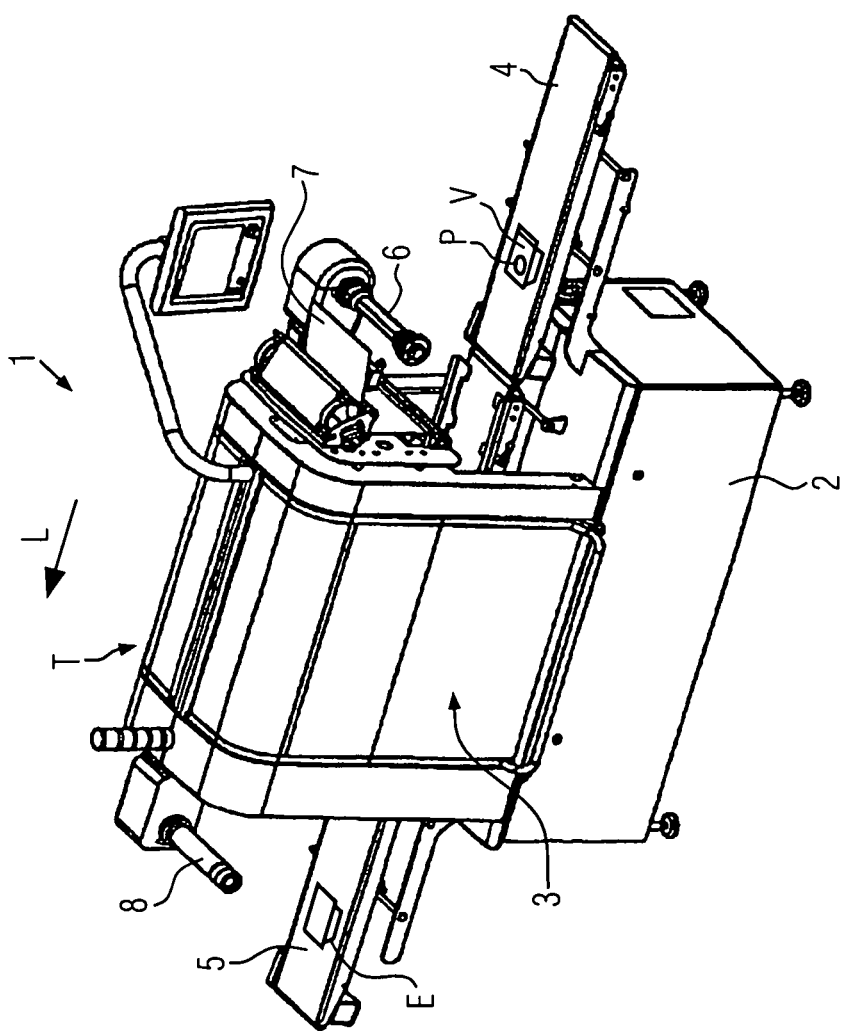
FIG. 1 is a perspective view of one embodiment of a packaging machine in the form of a tray sealer in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows in perspective a packaging machine 1. The packaging machine 1 is designed as a tray sealer T. The tray sealer T has a machine frame 2 and a sealing station 3 mounted on it, and the sealing station 3 is configured to produce packaging with a tear-off corner, especially vacuum skin packaging with a tear-off corner.

According to FIG. 1, the tray sealer T comprises a feeding unit 4, on which packaging trays V with products P are fed to the sealing station 3. Finished packing E are discharged on a discharge unit 5 further downstream in production direction L, behind sealing station 3. Furthermore, the tray sealer T has an unwind unit 6 for unwinding a top film 7 as well as a wind-up unit 8 for winding up a residual film material.

Figure 2:
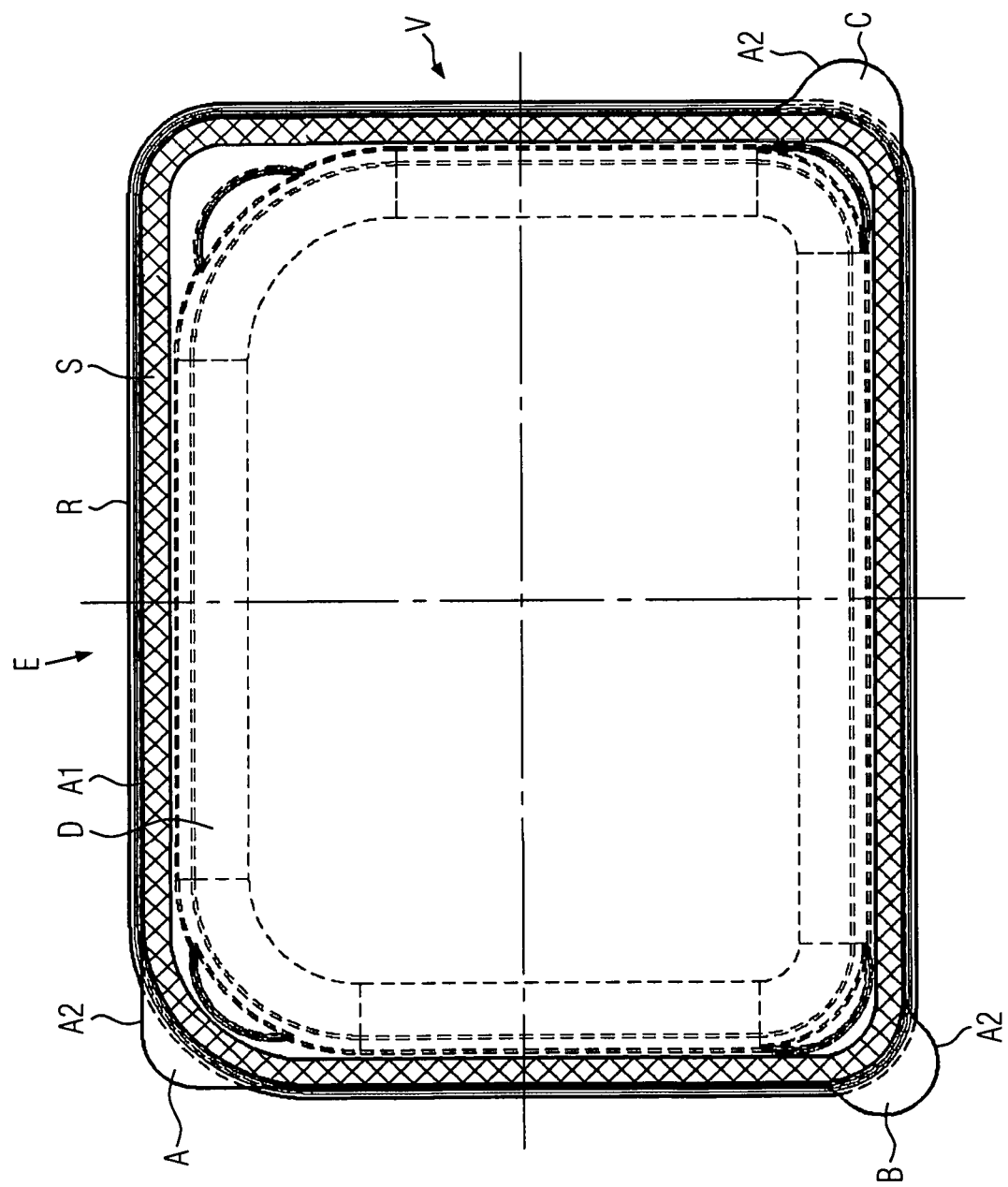
FIG. 2 is a plan view of one embodiment of a packaging produced in accordance with the teachings of the present disclosure with tear-open corners of preferred type.

FIG. 2 shows a plan view of packaging E with different tear-off corners A, B, C. The packaging tray V of packaging E has an edge area R along which a lid D is sealed by means of a sealing seam S produced by sealing station 3.

According to FIG. 2, the respective tear-off corners A, B, C protrude from the edge area R of the packaging tray V in plan view. A contour of lid D has a first section A1 running in plan view on edge region R of packaging tray V and a second section A2 running in plan view outside edge region R of packaging tray V, which defines a contour of the respective tear-open corners A, B, C.

Figure 3:
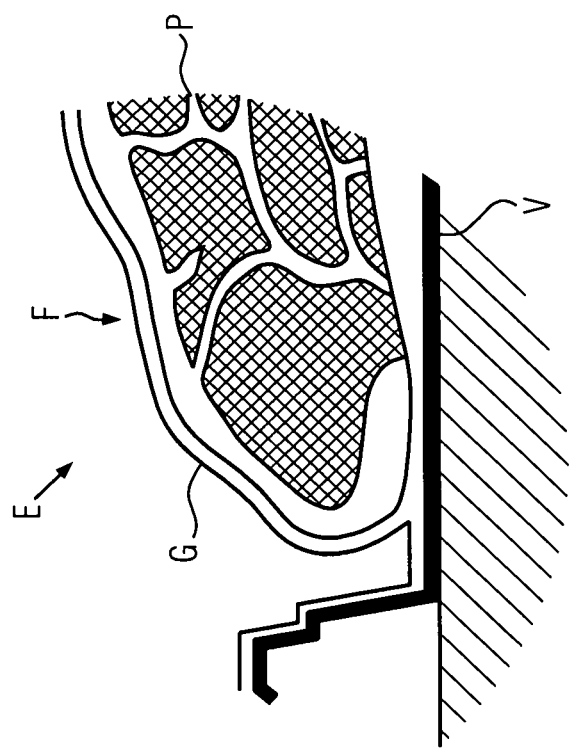
FIG. 3 is a schematic sectional view of a vacuum skin packaging in accordance with the teachings of the present disclosure.

FIG. 3 shows, in a schematic sectional view, a packaging E in the form of a vacuum skin packaging F. The vacuum skin packaging F has a skin film G which fits tightly along a contour of the product P. Product P is packed under vacuum, which prolongs its shelf life, as the biochemical deterioration of product P is slowed down by the removal of the atmosphere.

Figure 4:
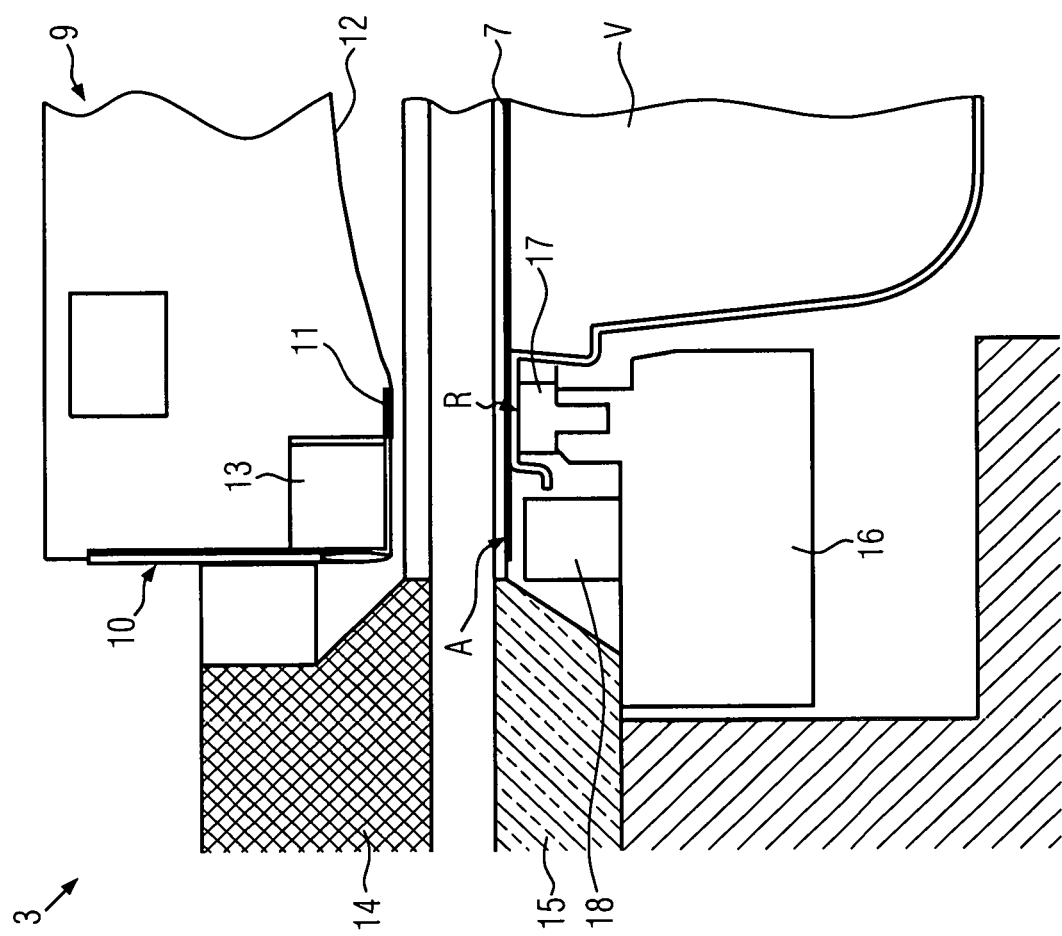
FIG. 4 is a schematic sectional view of one embodiment of a constructive part of a sealing station in accordance with the teachings of the present disclosure.

FIG. 4 shows a section of sealing station 3. Sealing station 3 comprises a sealing plate 9 with a cutting blade 10 attached thereto, and the sealing plate 9 forms a sealing surface 11 configured to produce the sealing seam S shown in FIG. 2. Furthermore, a cavity 12 is formed on the sealing plate 9, into which the top film 7 can be drawn in by means of a vacuum for preheating.

FIG. 4 also shows that a first clamping jaw 13 is attached to the sealing plate 9. The first clamping jaw 13 is preferably made of a different material than the sealing plate 9, for example as a plastic part.

In addition, the sealing station 3 has an outer frame 14 and a clamping frame 15 arranged below it. The outer frame 14 and the clamping frame 15 can be combined in such a way that they clamp and hold the top film 7 ready for the production process, in particular for cutting out the lid D and sealing it with the packaging tray V.

FIG. 4 also shows a tray holder 16, in which the packaging tray V is accommodated. The tray holder 16 has a circumferential sealing bar 17 on which the edge area R of the packaging tray V rests.

FIG. 4 also shows that a second clamping jaw 18 is attached to the tray holder 16. The first and second clamping jaws 13, 18 are pressed together to cut out the tear-off corners A, B, C to clamp the top film 7 between them. The cutting blade 10 shown in FIG. 4 then cuts out the tear-off corners A, B, C.

Figure 5:
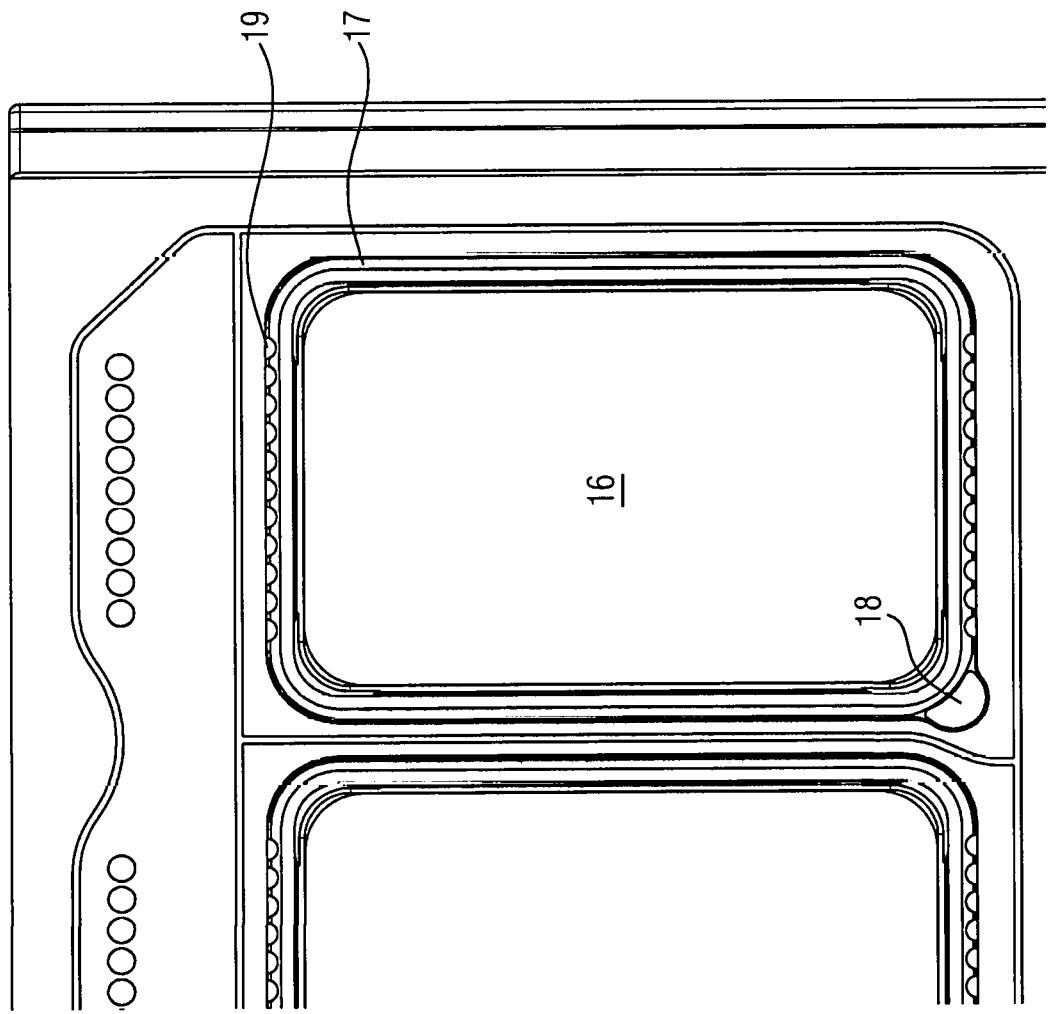
FIG. 5 is a plan view of one embodiment of a tray holder of a sealing station in accordance with the teachings of the present disclosure.

FIG. 5 shows the tray holder 16 in plan view. Outside the sealing bar 17, the second clamping jaw 18 is arranged at the bottom left, viewed in the image plane as shown in FIG. 5. FIG. 5 also shows that the tray holder 16 has evacuation or gassing openings 19 which can be used to create a predetermined, possibly temporary atmosphere within the packaging E to be produced.

Figure 6:
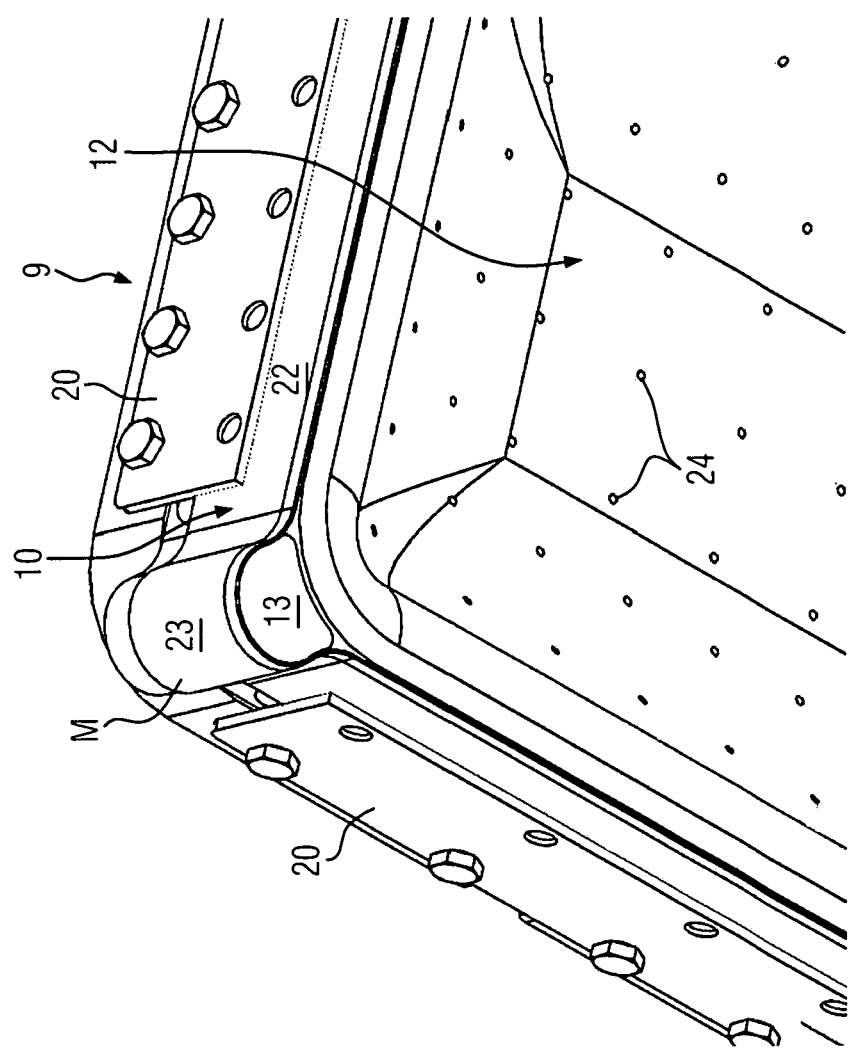
FIG. 6 is a perspective view from below of one embodiment of a sealing plate of a sealing station in accordance with the teachings of the present disclosure.

FIG. 6 shows a perspective view of a section of the sealing plate 9. The cutting blade 10 is detachably screwed to the outside of the sealing plate 9 by means of clamping bars 20. The cutting blade 10 is designed as an endless blade band M.

FIG. 6 also shows that the cutting blade 10 comprises a first blade section 22 to produce the first section A1 of lid D shown in FIG. 2 and a second blade section 23 to produce the second section A2 of lid D shown in FIG. 2. FIG. 6 also shows that the second blade section 23 is arranged adjacent to the first clamping jaw 13 according to a shape of the tear-off corners A, B, C to be produced.

FIG. 6 also shows that a plurality of evacuation and ventilation openings 24 are provided in the cavity 12. The evacuation and ventilation openings 24 are used to produce vacuum skin packaging F. A vacuum is created inside the sealing station 3 via the evacuation or ventilation openings 24 in order to draw the top film 7 for pre-heating by means of the vacuum into the cavity 12. During the subsequent dissolution of the vacuum, the pressure inside the sealing station 3 suddenly increases, whereby the preheated top film 7 is deposited as a skin over the product P.

Figure 7:
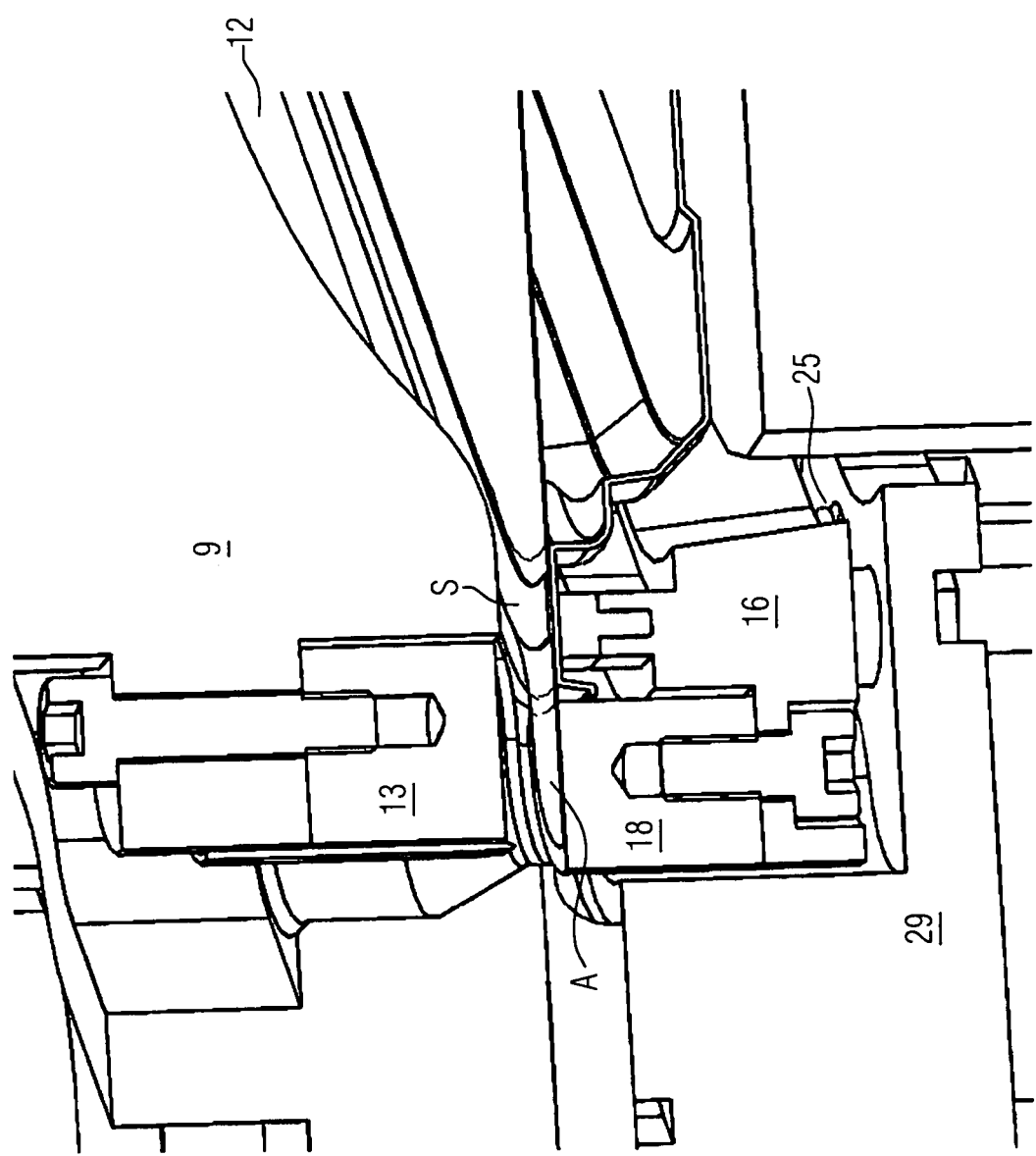
FIG. 7 is an enlarged schematic representation of one embodiment of a sealing station in accordance with the teachings of the present disclosure in the area of the clamping jaws for producing the tear-off corner.

FIG. 7 shows an enlarged section of sealing station 3. FIG. 7 shows that the two clamping jaws 13, 18 are detachably screwed to the sealing plate 9 or to the tray holder 16. FIG. 7 also shows a spring unit 25, which is provided between a bearing frame 29 and the tray holder 16. On the basis of spring unit 25, the tray holder 16 is supported adjustable in height and can be pressed towards the bearing frame 29 by means of sealing plate 9, especially during a sealing process.

FIG. 8 shows the sealing plate 9 and the tray holder 16 brought together. The two clamping jaws 13, 18 are pressed together. The top film 7 is clamped between the two clamping jaws 13, 18 and the tear-off corner A, B, C is cut out. For this purpose, the second blade section 23 of the blade 10 is received into a cutting blade holder 26 formed on the second clamping jaw 18 in order to cut out the tear-off corners A, B, C. The cutting blade holder 26 is shaped according to a contour of a cutting edge of the second blade section 23.

FIGS. 9A to 9F illustrate the process steps for a method according to the invention for the production of skin packaging F.

Figure 9A:
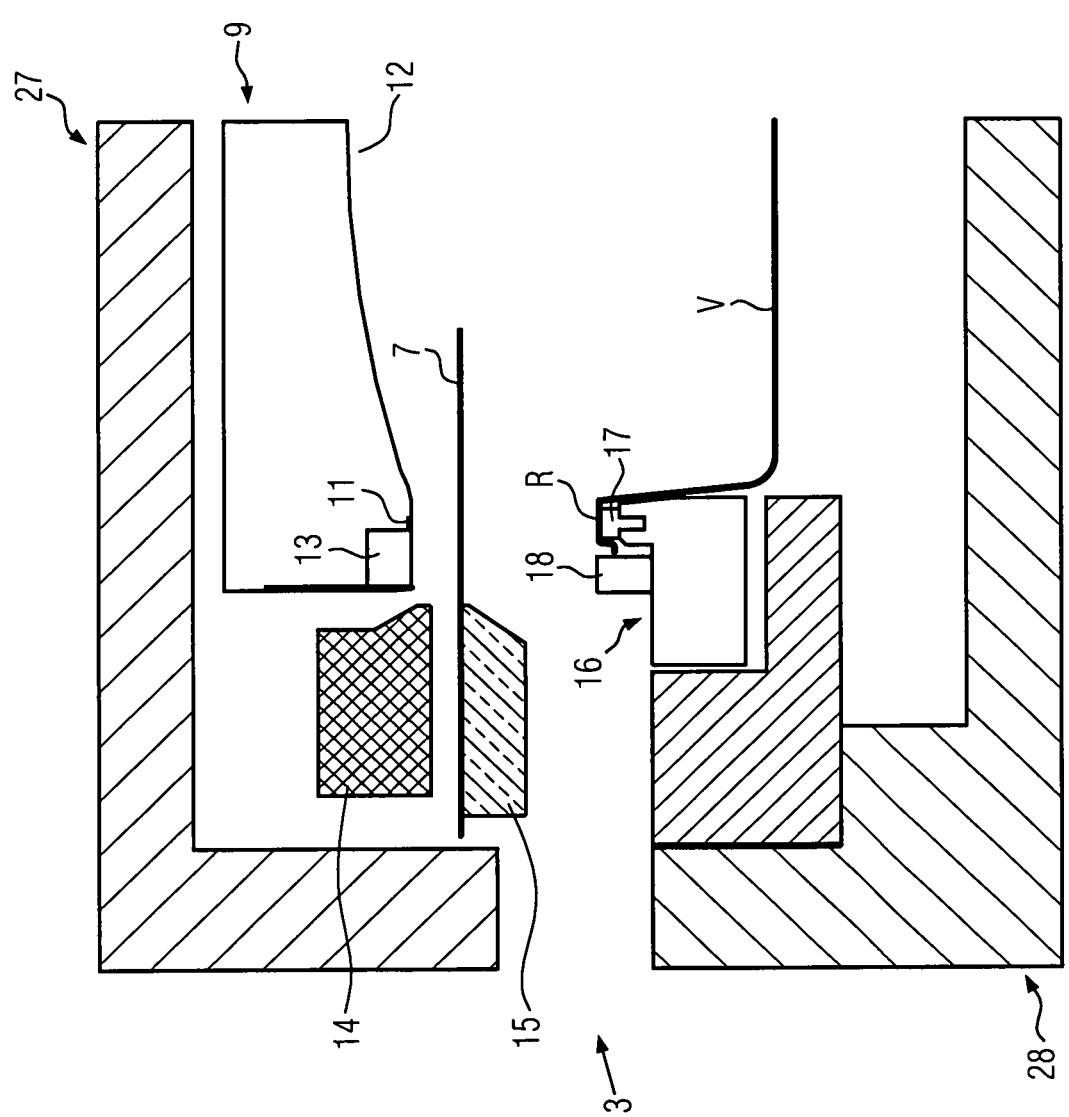
FIG. 9A is a schematic sectional view of one embodiment of a sealing station in accordance with the teachings of the present disclosure showing one of the process steps for producing skin packaging.

FIG. 9A shows the sealing station 3 in a schematic representation and FIG. 9A shows the sealing station 3 in an open state. The sealing station 3 has an upper die 27 with the sealing plate 9 and a lower die 28 with the tray holder 16.

In FIG. 9A, the top film 7 is inserted between the outer frame 14 and the clamping frame 15, but not yet clamped in between. The packaging tray V lies with its edge area R on the sealing bar 17 of the tray holder 16. The second clamping jaw 18 is positioned to the left of the sealing bar 17 on the tray holder 16 when viewed in the image plane.

From the arrangement shown in FIG. 9A, the top film 7 is now clamped between the outer frame 14 and the clamping frame 15 in a further process step in accordance with FIG. 9B. To do this, the clamping frame 15 is lifted vertically along the direction arrow P1 and the top film 7 is pressed against the outer frame 14. During clamping of the top film 7, the upper die 27 and the lower die 28 remain open.

Figure 9C:
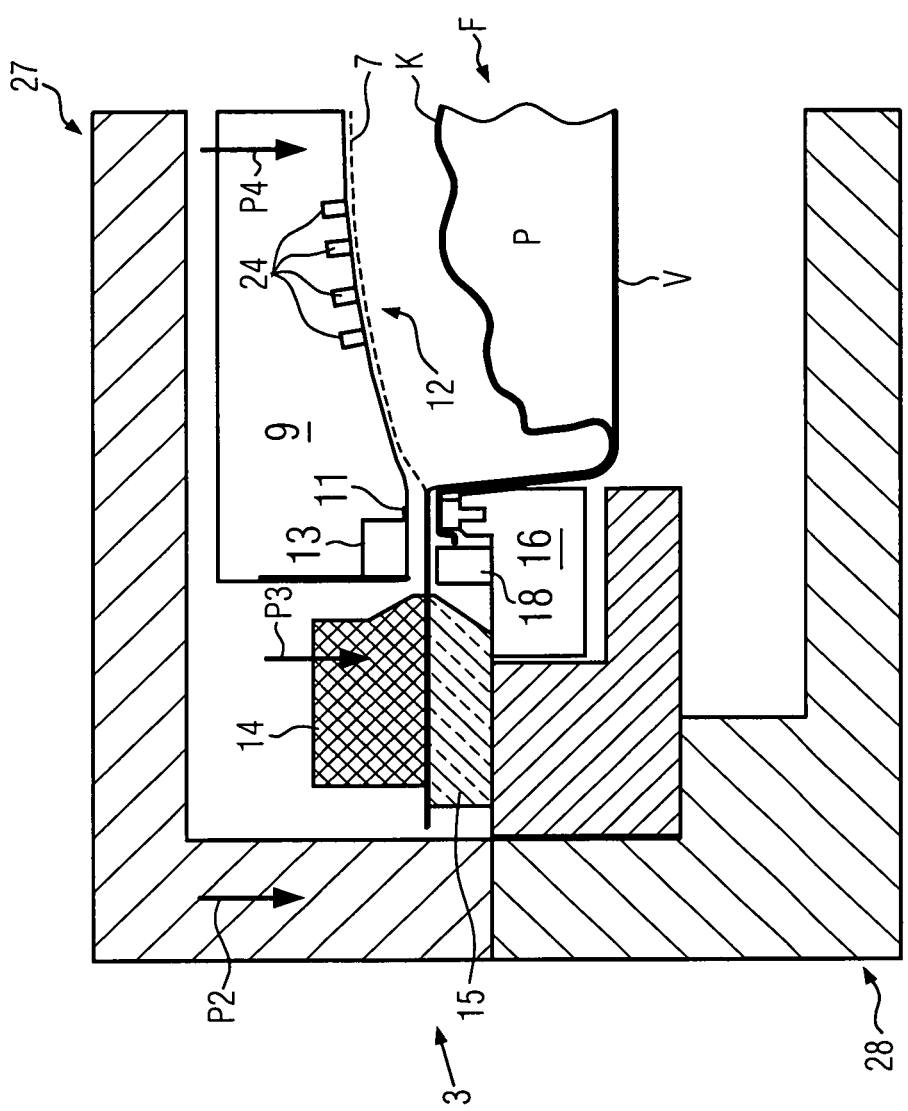
FIG. 9C is a schematic sectional view of one embodiment of a sealing station in accordance with the teachings of the present disclosure showing one of the process steps for producing skin packaging.

According to FIG. 9C, the upper die 27 and the lower die 28 of the sealing station 3 are closed. To do this, the upper die 27, including the sealing plate 9 and the compressed outer and clamping frames 14, 15, are lowered. The lowering of the upper die 27, the sealing plate 9 and the outer and clamping frames 14, 15 is shown schematically using the direction arrows P2, P3 and P4. The two clamping jaws 13, 18 have now moved closer together as shown in FIG. 9C. Alternatively, the lower die 28, including the tray holder 16, could be lifted in the direction of the upper die 27 to move the two clamping jaws 13, 18 closer together.

FIG. 9C also shows that a vacuum skin packaging F can be produced using the sealing station 3 in accordance with FIG. 3. FIG. 9C shows that a vacuum can be produced via the evacuation or ventilation openings 24 (see also FIG. 6) formed in the sealing plate 9 in order to draw the top film 7 shown in FIG. 9C in dashed line into the cavity 12 of the sealing plate 9 as an intermediate step. This preheats the top film 7, which is pulled upwards, so that it has improved material formability. After preheating the top film 7, the vacuum above the top film 7 is opened so that by means of the sudden pressure equalization, possibly by controlled pressure application above the top film 7, the preheated top film 7 within the sealing station 3 deforms in tight contact downwards along an inner side of the packaging tray V and the contour of the product P. This produces a skin K covering the contour of product P, which is deep-drawn along the inside of the packaging tray V and along the product contour. To produce the skin K, a vacuum (controlled negative pressure) could additionally be created below the top film 7 by means of the evacuation or gassing openings 19 shown in FIG. 5, whereby the preheated top film 7 can be deep-drawn downwards.

Figure 9D:
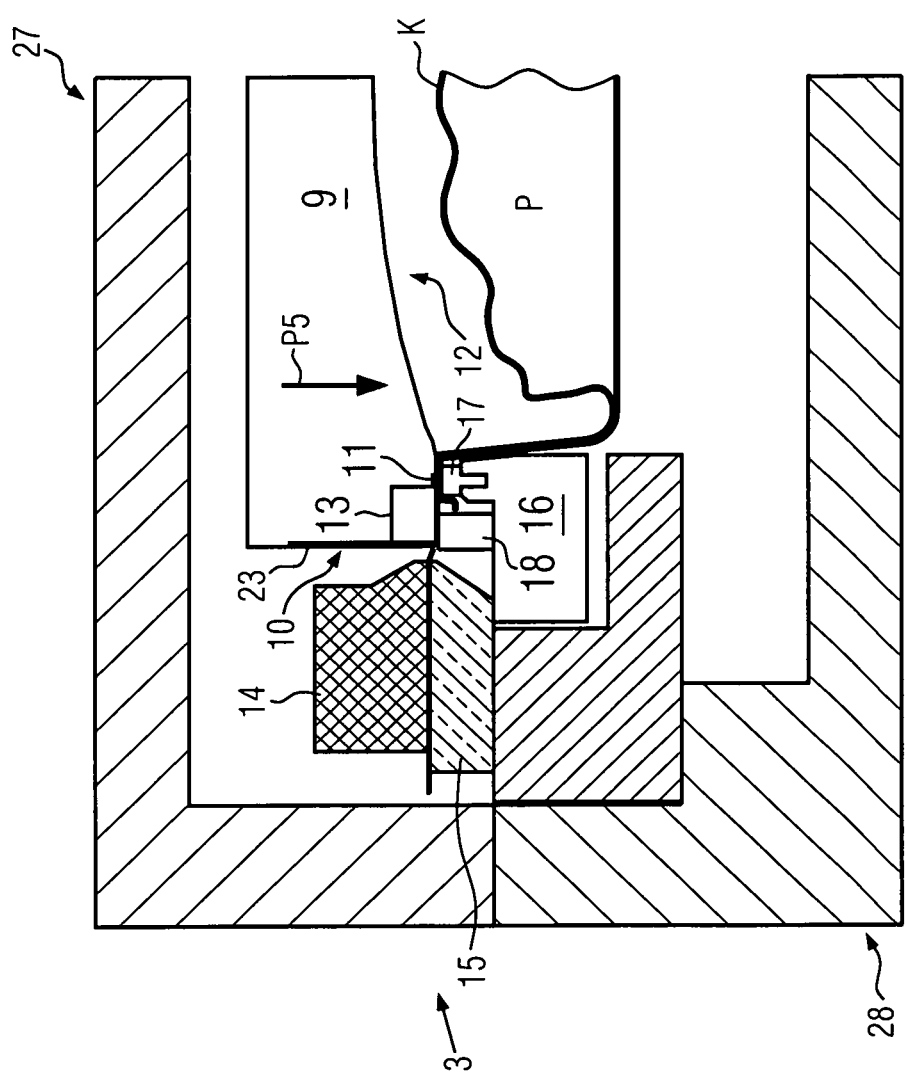
FIG. 9D is a schematic sectional view of one embodiment of a sealing station in accordance with the teachings of the present disclosure showing one of the process steps for producing skin packaging.

FIG. 9D shows the sealing plate 9 and the tray holder 16 fully compressed, whereby the first clamping jaw 13 is pressed onto the second clamping jaw 18 arranged below. At the same time, the cutting blade 10 attached to the sealing plate 9 is adjusted downwards with its second blade section 23 with the sealing plate 9 in such a way that it presses with the second blade section 23 against the second clamping jaw 18, whereby the tear-off corner A, B, C is cut out. The lowering of sealing plate 9 is shown schematically using the direction arrow P5.

Figure 9E:
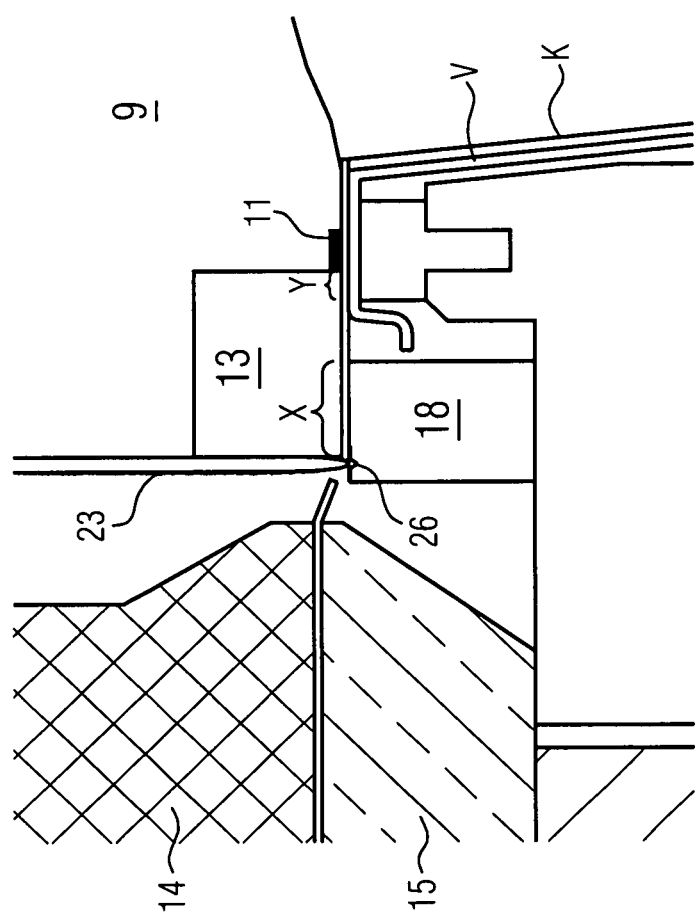
FIG. 9E is a schematic sectional view of one embodiment of a sealing station in accordance with the teachings of the present disclosure showing one of the process steps for producing skin packaging.

The cutting step shown in FIG. 9D is enlarged in FIG. 9E. FIG. 9E clearly shows that the first clamping jaw 13 is shaped in such a way that it presses both the top film 7 in the area of the tear-off corner A, B, C against the second clamping jaw 18 and the top film 7 partially against the edge area R of the packaging tray V. Thus the top film 7 for cutting out the tear-off corners A, B, C is optimally fixed. In this connection FIG. 9E shows that the first clamping jaw 13 presses the top film 7 against the second clamping jaw 18 in an area X and the top film 7 against a part of the edge area R of the tray holder V positioned below in an area Y. The top film 7, including the tear-off corners A, B, C, is cut before the sealing process.

Figure 9F:
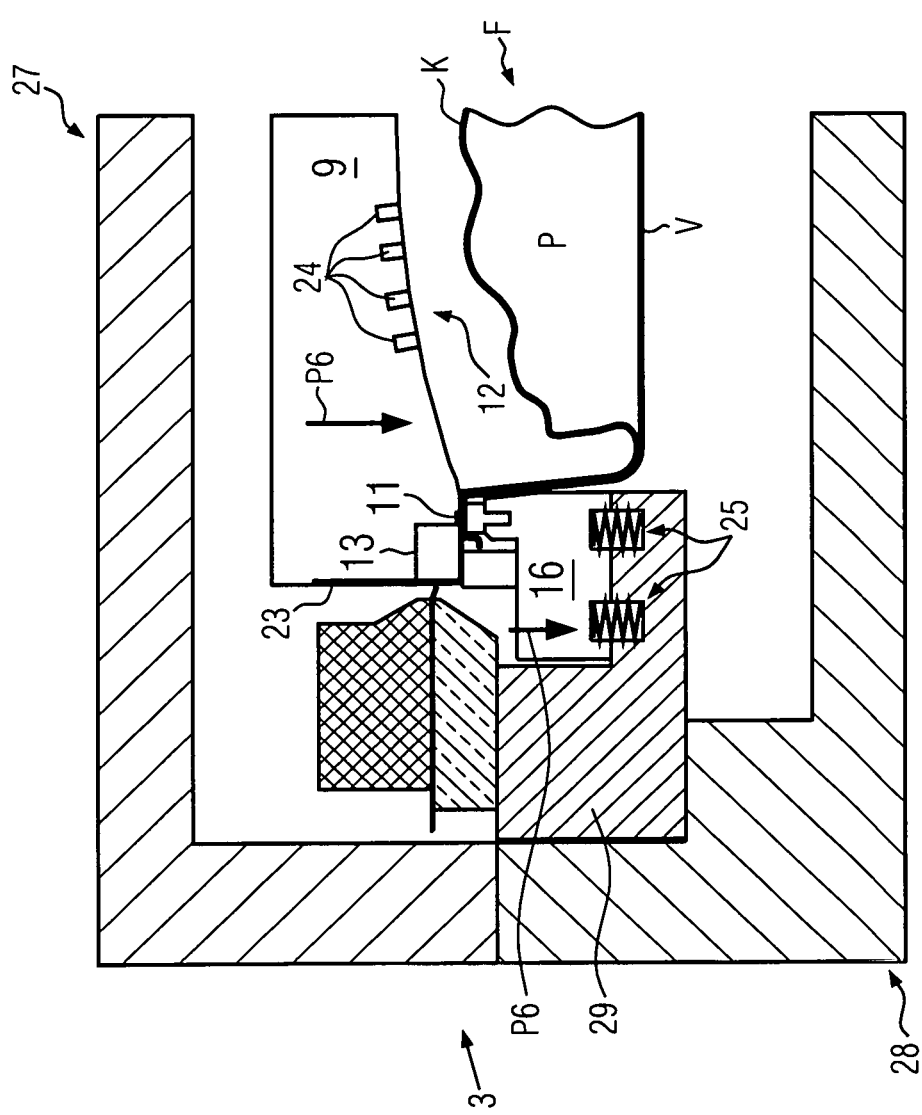
FIG. 9F is a schematic sectional view of one embodiment of a sealing station in accordance with the teachings of the present disclosure showing one of the process steps for producing skin packaging.

FIG. 9F schematically shows the sealing process. To do this, the sealing plate 9 is moved further downwards according to the direction arrow P6 from the position shown in FIG. 9D, thereby pressing the tray holder 16 towards the bearing frame 29. The spring assembly 25 arranged between the bearing frame 29 and the tray holder 16 is pressed together. During this lifting movement, the sealing seam S is produced around the edge area R of the packaging tray V by means of time-controlled pressure and temperature input.

The concept according to the invention can be used not only in the manufacture of vacuum skin packaging F but also for the manufacture of other types of packaging. For example, the sealing station according to the invention can be used to produce packaging with tear-open corners and without atmospheric exchange, packaging with tear-open corners and a gas-permeable lid film, and packaging with a protective atmosphere created therein.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

We claim:

1. A sealing station for a packaging machine comprising:
    an upper die with a sealing plate;
    a lower die including a tray holder for receiving a packaging tray to be sealed;
    a cutting blade arranged inside the sealing station disposed to cut out a lid for closing the packaging tray out of a top film, wherein the cutting blade is configured to cut out the lid along a contour of the lid and the cutting blade has an endless cutting edge which forms a first blade section and a second blade section, wherein the first blade section is formed for cutting out a first section of the contour of the lid extending in plan view on an edge region of the packaging tray;
    wherein the second blade section is formed for cutting out at least one second section of the contour of the lid extending in plan view outside the edge region of the packaging tray in order to produce a tear-off corner in the lid projecting beyond the edge region; and
    wherein a first clamping jaw is provided on the sealing plate outside a sealing surface provided thereon for producing a sealing seam and a second clamping jaw is provided on the tray holder, the first clamping jaw and the second clamping jaw being pressable together for cutting out the tear-off corner in order to clamp the top film including at least a portion of the material forming the tear-off corner between the first clamping jaw and the second clamping jaw.

2. The sealing station according to claim 1, wherein at least one of the first clamping jaw or the second clamping jaw is made of plastic.

3. The sealing station according to claim 1, wherein at least one of the first clamping jaw or the second clamping jaw is formed from a material having a lower thermal conductivity than the sealing plate.

4. The sealing station according to claim 1, wherein the second blade section is formed at least partially adjacent to the first clamping jaw.

5. The sealing station according to claim 1, wherein at least one of the first clamping jaw is detachably fastened to the sealing plate, or the second clamping jaw is detachably fastened to the tray holder.

6. The sealing station according to claim 1, wherein the first clamping jaw is formed such that, when the lid is cut out, the first clamping jaw is partially pressable onto the top film above the edge region of the packaging tray in plan view.

7. The sealing station according to claim 1, wherein the second blade section is configured to at least partially extend into the second clamping jaw when the first clamping jaw is pressed against the second clamping jaw to cut out the tear-off corner.

8. The sealing station according to claim 1, wherein the sealing plate has a plurality of ventilation openings for producing skin packaging.

9. The sealing station according to claim 1, wherein the sealing plate has a cavity defining the sealing surface, the cavity directed away from the tray holder.

10. The sealing station according to claim 1, wherein the cutting blade is an endless blade band releasably attached to the sealing plate.

11. A method for producing a skin packaging with a packaging machine having a sealing station, the method comprising:
receiving a packaging tray in a tray holder of a lower die of the sealing station, wherein the sealing station further includes an upper die with a sealing plate;
cutting out a lid having a tear-off corner from a top film that is a skin film using a cutting blade arranged within the sealing station, wherein the cutting blade is configured to cut out the lid along a contour of the lid and the cutting blade has an endless cutting edge which forms a first blade section and a second blade section, wherein the first blade section is formed for cutting out a first section of the contour of the lid extending in plan view on an edge region of the packaging tray, and the second blade section is formed for cutting out at least one second section of the contour of the lid extending in plan view outside the edge region of the packaging tray in order to produce the tear-off corner in the lid projecting beyond the edge region; and
producing a sealing seam all along the edge region of the packaging tray provided within the sealing station, wherein the tear-off corner of the lid cut out of the skin film projects outside the sealing seam in plan view;
wherein the sealing plate has a sealing surface for producing the sealing seam, a first clamping jaw is provided on the sealing plate outside the sealing surface, and a second clamping jaw is provided on the tray holder, the first clamping jaw and the second clamping jaw being pressable together for cutting out the tear-off corner in order to clamp the skin film including at least a portion of the material forming the tear-off corner between the first clamping jaw and the second clamping jaw.

12. The method according to claim 11, wherein the second blade section of the cutting blade at least partially extends into the second clamping jaw when the first clamping jaw is pressed against the second clamping jaw to cut out the tear-off corner.

13. The method according to claim 11, wherein when the lid is cut out in plan view, the first clamping jaw presses onto the skin film over a part of the edge region of the packaging tray.

14. A sealing station for a packaging machine comprising:
an upper die with a sealing plate having a sealing surface for producing a sealing seam;
a lower die including a tray holder for receiving a packaging tray to be sealed;
a cutting blade arranged inside the sealing station and configured to cut out a lid from a top film for closing the packaging tray, wherein the cutting blade is configured to cut out the lid along a contour of the lid and the cutting blade includes a first blade section and a second blade section, wherein the first blade section is formed for cutting out a first section of the contour of the lid that is extendable in plan view on an edge region of the packaging tray, and the second blade section is formed for cutting out at least one second section of the contour of the lid that is extendable in plan view outside the edge region of the packaging tray in order to produce a tear-off corner in the lid configured to project beyond the edge region;
a first clamping jaw provided on the sealing plate outside the sealing surface of the sealing plate; and
a second clamping jaw provided on the tray holder;
wherein the first clamping jaw and the second clamping jaw are pressable together for cutting out the tear-off corner and to clamp the top film including at least a portion of the material forming the tear-off corner between the first clamping jaw and the second clamping jaw, and wherein the sealing surface is configured to seal the lid to the packaging tray.

15. The sealing station according to claim 14, wherein the second blade section is formed at least partially adjacent to the first clamping jaw.

16. The sealing station according to claim 14, wherein the first clamping jaw is detachably fastened to the sealing plate.

17. The sealing station according to claim 14, wherein the second clamping jaw is detachably fastened to the tray holder.

18. The sealing station according to claim 14, wherein the first clamping jaw is formed such that, when the lid is cut out, the first clamping jaw is partially pressed onto the top film above the edge region of the packaging tray in plan view.

19. The sealing station according to claim 14, wherein the second blade section is configured to at least partially extend into the second clamping jaw when the first clamping jaw is pressed against the second clamping jaw to cut out the tear-off corner.

20. The sealing station according to claim 14, wherein the cutting blade is an endless blade attached to the sealing plate.

* * * * *